United States Patent Office 2,942,179
Patented June 21, 1960

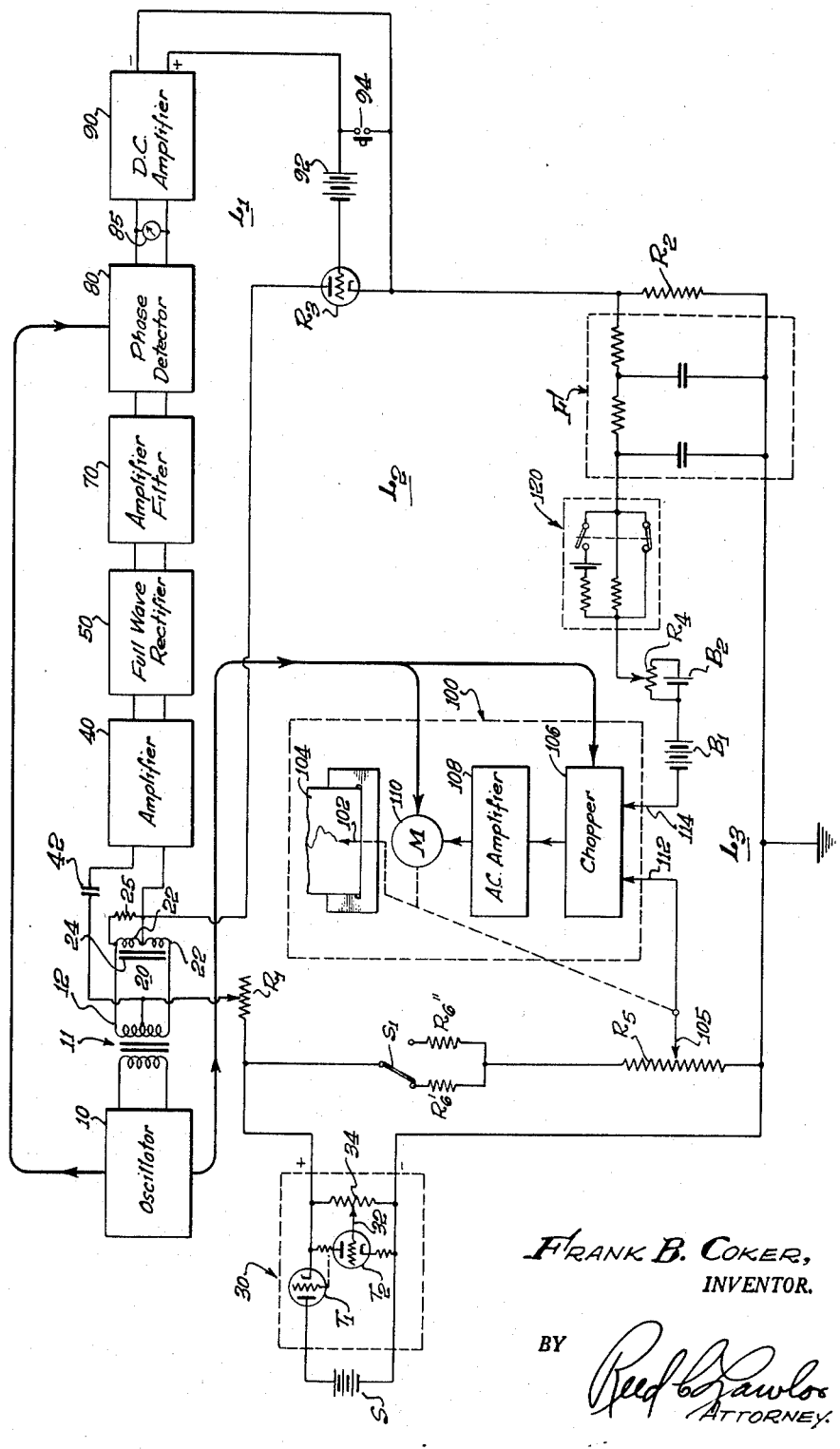

2,942,179
MAGNETOMETER CIRCUIT

Frank B. Coker, Monterey Park, Calif., assignor, by mesne assignments, to United Geophysical Corporation, Pasadena, Calif., a corporation of California Filed Nov. 12, 1953, Ser. No. 391,575

16 Claims. (Cl. 324—43)

This invention relates to magnetometers and more particularly to improvements of magnetometers of the type in which a compensating magnetic field is created automatically to balance an ambient magnetic field, the strength of which is to be measured.

Magnetometers of the flux-gate type have been employed to detect and measure small differences in the strength of the earth's magnetic field as the magnetometer is moved from point to point over the earth. Such magnetometers have been carried by airplanes in order to rapidly survey the earth's magnetic field along the course of flight. Such surveys often exhibit anomalies that indicate the presence of some object or formation that has modified the earth's magnetic field locally. When the flight is over water, the anomaly sometimes indicates the presence of submarines or other metallic sea-going vessels. In other cases, whether the flight is over the sea or over land, such anomalies aid in locating formations that are likely to contain valuable mineral deposits such as oil or metallic ores. Such magnetometers may also be carried by automobiles or otherwise by land over the earth's surface in order to locate such anomalies indicative of the presence of mineral deposits.

The strength of the earth's magnetic field is of the order of 0.5 Gauss. Significant differences in the strength of the magnetic field in such an anomalous area are often of the order of less than 0.1% of the earth's field and are so small compared to the total strength of the earth's magnetic field that the measurements of the field strength are usually expressed in $\gamma$, where $$1\gamma = 10^{-5} \text{ Gauss}$$

Because of the fact that such small differences in the strength of the magnetic field may be significant, it is important that the magnetometer employed for its measurement be very sensitive and also very stable. Unless it is sensitive, small, significant anomalies cannot be detected at all. Unless it is stable, the measurements may be masked by long term fluctuations sometimes called "drift" or by random rapid variations, sometimes called "noise."

In order to achieve the desired degree of accuracy systems have been developed in which a magnetometer element detects the strength of the magnetic field at a particular point at which it is desired to make a measurement and the output of the element is employed to operate various electrical devices including amplifiers, motors, rectifiers and sources of current to generate a compensating magnetic field which acts on the element in opposition to the ambient magnetic field. Systems of this type are shown by way of example in Frowe, Patent No. 2,584,571 and Brewer, Patent No. 2,606,229. In the Frowe system, the magnetometer element employed for detecting the magnetic field is in the form of a winding which rotates about an axis perpendicular to the component of the magnetic field being detected. In this system, the compensating magnetic field is regulated automatically by means of a servo-mechanism. In the Brewer system, the magnetometer elements are of the flux-gate type. In the latter system, the adjustment of the compensating magnetic field is produced automatically by means of a negative feed-back circuit. For convenience the term "feed-back loop" is employed hereinafter to refer to the series of elements that produce the automatic compensation regardless of whether the compensation is accomplished by means of a servo-mechanism or by means of electrical amplification.

In both the Frowe and the Brewer et al. systems, as well as other systems in which a compensating magnetic field is generated automatically, an auxiliary source of current is employed to buckout almost all of the magnetic field being measured and the control system is required to produce an additional compensating current sufficient to balance the residue. In such systems the auxiliary current source is subject to fluctuations and drift, some of which may result from temperature changes, some of which may occur spontaneously, and some of which may be due to aging caused by the drain of current drawn from the source. Such changes in the auxiliary current source cause corresponding changes in the unbalanced residue of the magnetic field which is being measured.

Consequently, in order to obtain accurate measurements of the field strength with such prior systems, it is necessary to accurately measure the current being supplied from the auxiliary sources as well as the current being controlled by the feed-back loop and to combine the readings of the two currents. The requirement of reading both currents accurately may be satisfied by employing two current indicating devices connected to the two sources. This requirement may also be satisfied by providing an arrangement for alternately measuring the currents supplied by the two sources. The first method is unduly expensive and impractical. The second method is subject to other difficulties. Furthermore, when it is desired to produce a continuous recording of the variations in the magnetic field strength along a line of exploration, it is highly desirable that the record made represent the variations in the field strength from point to point without requiring any correction for fluctuations or shifts in current produced in an auxiliary circuit or otherwise. Also, in order that accurate readings may be obtained as the magnetometer is carried along a line of exploration, it is highly desirable that the part of the system that controls the compensating magnetic field respond substantially instantaneously.

While it is desirable that the magnetometer employed be capable of measuring and indicating accurately large differences in magnetic field strengths between various points, such as differences of about 10,000 $\gamma$ or more, it is also desirable that the magnetometer indicate accurately differences in strength of the order of 1 $\gamma$. Also, in order that accurate readings may be obtained as the magnetometer travels along a line of exploration, it is highly desirable that the part of the system that controls the compensating magnetic field respond substantially instantaneously.

An object of this invention is to provide a magnetometer of the type described in which the compensating field is produced by varying a current supplied from a single current source in response to the net magnetic field to which the magnetometer element is exposed.

Another object of the invention is to provide such a system in which the strength of the compensating current is substantially independent of variations in the characteristics of any elements such as resistors connected to the winding through which the compensating current flows.

Another object of the invention is to provide such a system in which the signal produced in response to the magnetic field is amplified without danger of introducing spurious signals and in which the amplified signal is then employed to vary the current supplied from a single current source to produce the compensating magnetic field.

Another object of the invention is to provide a system for setting the strength of the compensating magnetic field initially at a value which will permit the feed-back system to operate efficiently to balance fluctuations in the residual magnetic field without impairing the accuracy of the observations.

Another object of the invention is to provide a magnetometer which employs a neutralizing-current source which need not be extremely stable in order to achieve a high degree of accuracy.

Still another object of the invention is to provide a system in which a large portion of the compensating current may be neutralized and accurate measurements of the residue may be made without introducing any substantial errors that would be indicated or recorded as spurious parts of the magnetic field.

A still further object of the invention is to provide a magnetometer in which the sensitivity and calibration may be easily checked.

A still further object of the invention is to provide a magnetometer having an output which can be recorded as the magnetometer travels over the surface of the earth and which will indicate accurately the differences in strength of a component of the magnetic field at different points along the line of travel.

A still further object of the invention is to provide a magnetometer in which the sensitivity and the zero setting of the indicator may be adjusted independently of each other and without altering the current that produces the compensating magnetic field.

A still further object of the invention is to provide a magnetometer with a recorder of the self-balancing potentiometer type which employs as a source of reference voltage the same source which supplied current to produce the compensating magnetic field.

The foregoing and other objects of the invention together with various advantages thereof will be set forth in the following description of one embodiment of the invention which is illustrated schematically in the single figure of the drawing.

While this invention is applicable to magnetometers of other types, it is illustrated and described herein with particular reference to its application to flux-gate magnetometers that employ unbalanced bridge circuits. Such a system is shown in the single figure where current from an oscillator 10 is impressed upon an unbalanced bridge circuit 20 employing a pair of flux-gate magnetometer elements 22 in one branch thereof. The two magnetometer elements 22 comprise separate windings wound on a common magnetic core 24 that is in the form of a thin lamination or strip of ferromagnetic material which has high permeability and a B—H curve that is characterized by a sharp knee at saturation. A resistor 25 connected across one of the windings 22 serves to unbalance the bridge electrically.

In order to measure the strength of a component of a magnetic field such as the earth's magnetic field along a particular direction, the axis of the core 24 is aligned with that direction. The alignment may be accomplished manually or it may be accomplished automatically. If the component of the earth's magnetic field of interest is vertical, the magnetometer elements may be supported upon a pendulum which maintains the core vertical. If the strength of the entire magnetic field of the earth is to be measured at a point, the core is mounted upon a gimbal mechanism which is provided with a pair of auxiliary magnetometer elements that are arranged along axes perpendicular to each other in a plane perpendicular to the axis to the core 24 and suitable means of a type well-known in the art is employed to maintain the axis of the core 24 aligned with the earth's magnetic field.

In such a magnetometer, when an alternating current is applied to the input of the bridge circuit 20 of a magnitude sufficient to drive the magnetometer elements with more than enough magnetomotive force to saturate the elements in each half cycle of operation, series of alternate positive and negative pulses appear at the output of the bridge circuit. The arithmetic sum of the amplitudes of the pulses is substantially constant even if substantial changes occur in the ambient magnetic field to which the magnetometer is exposed. However, the arithmetic difference in the amplitudes of the pulses is proportional to the strength of the component of the magnetic field which lies along the axes of the elements.

According to the present invention, the output of the bridge circuit 20 is employed to control the current supplied from a single current source 30 to produce a magnetic field which has a component at the core 24 that is substantially equal and opposite to the strength of the component of the ambient magnetic field being measured. The control is effected substantially instantaneously to avoid spurious effects that might be introduced otherwise. The various means by which this control is effected to produce highly accurate and reproducible results are considered in detail hereinafter.

The current source 30 is connected in series with a field balance resistor $R_1$, a precision resistor $R_2$, and a variable resistor $R_3$, in the form of a triode and this series of elements is connected across the output of the bridge circuit 20. With this arrangement, current from the current source 30 flows in the current loop $L_2$ through the precision resistor $R_2$, variable resistor $R_3$, and the two windings 22 of the respective magnetometer elements, and thence through the corresponding halves of the secondary winding 12 of transformer 11 and through the field balance resistor $R_1$. When the two magnetometer elements are formed by separate windings on a common core 24 as in the case illustrated here, the two windings 22 are so wound that the magnetomotive forces applied to the core 24 by the flow of current through those windings from the source 30 are in the same direction in the core. In practice, the connections are so arranged that the compensating magnetic field produced in the core 24 by the current flowing in the windings 22 is in a direction opposite to that of the component of the ambient magnetic field to which the core 24 is exposed. With this arrangement the magnetometer element responds to the component of the net or resultant magnetic field that is parallel to the core 24.

In order to produce a compensating magnetic field which balances the ambient magnetic field, the output of the bridge circuit 20 is passed through an amplifier 40 and thence to a full-wave rectifier 50. The amplifier 40 includes a blocking capacitor 42 at its input in order that all of the single compensating current shall pass through the magnetometer windings 22. A saw-tooth wave appearing at the output of the rectifier is then passed through a combination amplifier and band pass filter 70 and a phase detector 80, all as explained in more detail and claimed in copending patent application Serial No. 391,576, filed by Frank B. Coker, November 12, 1953. By employing a class A power amplifier as the amplifier 40, a high degree of accuracy is attained as explained in said application. In the system described in that application, the charging circuit of the rectifier 50 has a time constant which is about equal to or greater than the period of the waves supplied by the oscillator 10 and the amplifier-filter 70 is adapted to pass only the harmonic component of the saw-tooth wave which is of the same frequency as the current supplied by the oscillator 10. With such an arrangement, an alternating current appears at the output of the combination amplifier and filter 70 of the same frequency as the waves applied to the bridge circuit 20 and of an amplitude proportional to the strength of the net component of the magnetic field to which the core 24 is exposed. Furthermore, the phase of the alternating current at the output of the combination amplifier and filter 70 reverses when the direction or sense of the magnetic field component lying along the axis of the element 24 is reversed. The magnitude of the output of the amplifier 70 may be measured by means of a meter 85 for purposes to be explained in detail hereinafter.

The output of the amplifier 70 is passed through the phase detector 80 and D.C. amplifier 90 to produce a D.C. voltage for varying the bias of the triode $R_3$, the bias being so varied as to alter the current flowing from the current source 30 through the windings 22 in such a way as to automatically compensate for any changes in the strength of the ambient magnetic field. Thus, with this arrangement if the strength of the ambient magnetic field to which the core 24 is exposed increases, the output of the amplifier 70 increases in a corresponding manner causing a corresponding increase in the D.C. voltage supplied by the D.C. amplifier 90 to the resistor $R_3$. With the output of the D.C. amplifier 90 so connected as to reduce the bias on the triode $R_3$, the resistance of the triode decreases and the current flowing through the windings 22 increases in order to increase the strength of the compensating magnetic field by an amount which is substantially equal to the increase in the ambient magnetic field. Likewise, with this arrangement, a decrease in the strength of the ambient magnetic field causes the value of the current supplied to the windings 22 to be adjusted automatically by an amount to produce a corresponding decrease in the strength of the compensating magnetic field. The appropriate connection of the phase detector 80 and the D.C. amplifier 90 to the triode $R_3$ is indicated by + and − signs in the diagram showing that an increase in ambient magnetic field strength adds a positive voltage to the bias existing on the triode $R_3$ thereby decreasing the bias and a decrease in the ambient magnetic field adds a negative voltage to the bias thereby increasing the bias. The action of the feed-back loop $L_1$ that produces the compensating is very rapid being substantially instantaneous.

As more fully explained in said copending application, the employment of a class A power amplifier at the output of the unbalanced bridge circuit 20 has the advantage over other types of amplifiers in that positive and negative pulses appearing at the output of the bridge circuit are amplified in equal, almost constant and unvarying proportions so that the difference in amplitudes of such pulses is accurately indicated at the output of the amplifier 70 without danger of introducing spurious readings that might otherwise be introduced such as by variations in characteristics of the amplifier tubes employed in the amplifier 40. As explained in that application, the reliability and accuracy of the results indicated at the output of the amplifier 70 is less dependent upon the characteristics of the tubes employed in the amplifier 40 for resultant magnetic fields of small amplitude than for resultant magnetic fields of large amplitude. It is thus seen that by employing a class A power amplifier in the feed-back loop $L_1$ the magnitude of the compensating magnetic field can be varied automatically to balance the magnitude of the ambient magnetic field without danger of introducing spurious effects due to changes in the characteristics of the amplifier 40. Furthermore, the employment of such a feed-back system causes the compensating magnetic field to have a value that is substantially independent of changes in characteristics of the other elements in the circuit including those of the rectifier 50, the amplifier filter 70, the phase detector 80, the D.C. amplifier 90, the bias battery 92, the triode $R_3$, and those of the resistors $R_1$ and $R_2$ and the voltage of the current source 30. Hence the single compensating current is maintained at a value which nearly exactly balances out the ambient magnetic field at the magnetometer element 24.

The potential produced across the precision resistor $R_2$ by the compensating current flowing therethrough is thus proportional to the strength of the compensating magnetic field. In order to measure the value of the current producing the compensating magnetic field, a self-balancing recording potentiometer 100 is employed.

The potentiometer 100 is of a conventional type which is adapted to compare two voltages and to displace its recording element 102 from a zero position to a recording position by a distance corresponding to the difference between the two voltages. In practice, recording paper 104 is moved continuously by a motor past the recording element 102 as the magnetometer is carried along a line of exploration, in order to continuously record variations in the strength of the magnetic field of the earth from point to point along that line.

The self-balancing potentiometer 100 shown, employs a chopper 106, an A.C. amplifier 108, and a balancing motor 110. The balancing motor 110 is connected to the recording element 102 and to a sliding contact 105 of a potentiometer resistor $R_5$, across which a constant reference voltage is applied. A fraction of the reference voltage, as determined by the position of the contact 105, is applied to input terminal 112 and a voltage to be measured is applied to another input terminal 114. In practice the difference in voltage appearing at the terminals of 112 and 114 is converted by the chopper 106 into an alternating square-wave voltage which is passed through the A.C. amplifier 108 to drive the motor 110 in such a direction as to move the contact 105 to a position on the resistor $R_5$ at which the voltage applied to the input of the chopper is reduced to zero. At this point the fraction of the reference voltage applied to the input terminal 112 equals the voltage to be measured. Inasmuch as the recording element 102 is connected directly to the sliding contact 105 the position of the recording element 102 accordingly indicates the value of the voltage appearing at the input terminal 114. With such an arrangement if the resistor $R_5$ is linear, that is if its resistance per unit of its length or displacement of the slider, is uniform, changes in voltage at terminal 114 produce proportional displacement of the recording element 102 on the recording paper 104.

The voltage impressed upon the input 114 of the self-balancing potentiometer 100 is derived from the precision resistor $R_2$. More particularly, the ungrounded end of the resistor $R_2$ is connected in series with batteries $B_1$ and $B_2$ to input terminal 114 of the potentiometer 100. The connection to the battery $B_2$ is made through a zero-shift resistor or potentiometer $R_4$ so that an adjustable portion of the voltage from battery $B_2$ and all of the voltage of the battery $B_1$ are in series with the potential appearing across the precision resistor $R_2$. The total voltage thus introduced in series is slightly less than the potential that appears across the resistor $R_2$.

The two batteries $B_1$ and $B_2$ are of a very stable type which are free from random voltage fluctuations and which are free from gradual voltage drift, when little or no current is being drawn from them. Batteries of a type which have proved eminently successful for this purpose are mercury cells manufactured by P. R. Mallory & Company, of North Tarryton, New York, such mercury cells being manufactured and sold under the designation RM 1 and RM 12. The battery $B_1$ produces a much greater voltage than battery $B_2$ and in fact battery $B_2$ and potentiometer $R_4$ serve only to provide a slight adjustment in the total voltage difference between the terminal 114 and the arm of potentiometer $R_4$. Thus, for example, battery $B_1$ may consist of 15 RM–1 cells which are rated at 1.345 volts each while battery $B_2$ may consist of only 3 RM–12 cells which are rated at 1.345 volts each. With a value of the zero-shift resistor $R_4$ such that the drain on the cells of battery $B_2$ is less than about 0.2 ma., and with no substantial drain on the cells of battery $B_1$, it is found that no substantial fluctuations or drift of voltage occurs in these cells which would interfere with the accurate measurement of changes in the current flowing through the precision resistor $R_2$ to an accuracy of about 1 part in 50,000 parts.

The motor 110 and chopper 106 are driven by power derived from the oscillator 10.

A low pass filter F having a cutoff frequency which is very low compared with the frequency of the oscillator 10 is employed in order to prevent any appreciable signal at that frequency from being applied to the input terminal 114 of potentiometer 100. Thus when the frequency of the oscillator is 400 c.p.s., the cutoff frequency is about 5 c.p.s. The use of such a filter F is very advantageous when the chopper is driven at the same frequency as that applied to the bridge circuit. In such a case the filter prevents any systematic errors that might be introduced by the synchronous rectifying action that the chopper 106 would apply to signals of 400 c.p.s. reaching the potentiometer 100 from the precision resistor $R_2$. A calibration circuit 120 is connected in the lead between the ungrounded end of the precision resistor $R_2$ and the input to the potentiometer 100.

The other voltage that is to be compared in the potentiometer 100 appears across the variable potentiometer resistor $R_5$. To provide the desired reference voltage, the potentiometer $R_5$ is connected in series with a sensitivity-control resistor $R_6'$ or $R_6''$ across the output of the current source 30. By manipulation of a sensitivity control switch $S_1$, one or the other of the resistor $R_6'$ or $R_6''$ may be selectively connected in the circuit to change the value of the current flowing through the potentiometer $R_5$ by any desired ratio. Any variations in voltage appearing across the output of the current source 30 are reproduced in proportional amount across the potentiometer $R_5$. However, since the value of the voltage impressed from the precision resistor $R_2$ on the self-balancing potentiometer 100 is only a small fraction of the total voltage across resistor $R_2$, fluctuations in the voltage appearing across the potentiometer 105 are of little significance as explained more fully hereinafter.

The voltage appearing between the sliding contact 105 of the potentiometer $R_5$ and ground is matched in the self-balancing potentiometer 100 against the fraction of the voltage applied thereto from the precision resistor $R_2$ and the batteries $B_1$ and $B_2$ as explained above. Under these conditions the sum of the voltages in the potentiometer loop $L_3$, including the resistor $R_2$ the batteries $B_1$, and $B_2$, and the included portion of the potentiometer $R_5$, is zero.

The calibration circuit 120 is of a simple type which is adapted to inject a voltage of standard value in series between the input terminal 114 and the ungrounded end of the precision resistor $R_2$. When such a voltage is injected in the lead in question, it in effect introduces a virtual, or apparent, change in the compensating magnetic field and the self-balancing potentiometer 100 displaces its recording element 102 by an amount corresponding to the magnitude of the virtual change in the strength of the magnetic field. The value of the voltage so injected for this purpose is chosen to represent a predetermined change in magnetic field strength of, say, 100 $\gamma$. Accordingly, whenever it is desired to check the calibration of the instrument, it is merely necessary to inject the calibrating voltage temporarily.

This calibration circuit is very effective because the magnetometer element 24 has substantially constant D.C. current sensitivity which might be expressed in units of $\gamma$/ma. for example. In addition, the null type of operation provided by the feed-back of the compensating current continually maintains the magnetometer core in nearly a zero resultant magnetic field and thus the magnitude of the compensating current is a direct and accurate measure of the ambient magnetic field being measured. This condition is not upset by variations in the magnetometer circuit such as changes in the amplitude of the energizing current supplied by oscillator 10, or by changes in the sensitivity of the bridge circuit 20 to changes in magnetic field strength. For this reason the introduction of a standard change of potential into the potentiometer input causes the pointer 102 to move to a new position which is a direct indication of the effect which would be produced by a corresponding change in the ambient magnetic field. The value of the potential change introduced to provide the effect of a fixed change in magnetic field depends only upon the current sensitivity of the element 24 and the resistance of precision resistor $R_2$, both of which are very constant values. In practice, then, the introduction of this standard change in potential provides a direct calibration checking means.

If it is found that the injection of the calibrating voltage does not produce the desired displacement of the recording element 102, the potential across the output of the current source 30 is adjusted to produce the voltage across the potentiometer $R_5$ required to produce that displacement. To permit such adjustment without disturbing the remainder of the circuit, the current source 30 is of a type which includes a regulated voltage supply including a series tube $T_1$ and a shunt tube $T_2$ for automatically regulating the value of the voltage appearing across the output, irrespective of changes in voltage occurring in the battery S or other source of D.C. voltage at its input and irrespective of variations in the load circuit supplied by the source. The magnitude of the voltage appearing across the output is varied by adjusting the position of a sliding contact 32 of a potential-dividing resistor 34 shunted across the output of the current source 30. The adjustment of the sliding contact 32 varies the proportion of the output voltage that is impressed on the control grid of the shunt tube $T_2$ and hence the output voltage itself because of the change in feed-back ratio. Inasmuch as the impedance of the current source 30, as measured across its output, is very low compared to the resistance values of the various circuit elements connected thereto externally, the effective value of this resistance is not changed substantially by movement of the sliding contact, even though the voltage appearing at the output may be changed considerably.

In practice the feed-back loop $L_1$ is capable of compensating for variations in magnetic field strength over only a limited range of magnetic field strength. This is due partly to the limitations in the range of operation of the unbalanced bridge circuit 20 and partly to the fact that the elements of the feed-back loop $L_1$, including the class A amplifier 40, the variable resistor $R_3$, or intervening elements, become insensitive when changes in magnetic field beyond a predetermined value are applied to the magnetometer 24. For this reason the field balance resistor $R_1$ is employed to set the magnitude of the compensating field at a value about equal to the average value of the ambient field that is likely to be encountered in the course of the investigation. For example, the amplifier feedback loop $L_1$ may be adapted to operate very effectively over a range of about ±5,000 $\gamma$. In such a case, if variations in magnetic field strength of less than 10,000 $\gamma$ are to be measured and the average value of the total magnetic field strength that is likely to be encountered is 50,000 $\gamma$, the value of the resistor $R_1$ is set at a point such that the compensating field produced at the core 24 is about 50,000 $\gamma$. The actual value of the average compensating field is computed from the value of the potential of the battery $B_1$ and the setting of the resistor $R_4$, the instrument having previously been calibrated to make such computation possible.

When the instrument is so set, the position of the pointer 102 corresponding thereto is a zero or reference position and displacements of the pointer therefrom indicate deviations in the strength of the magnetic field at various points from the value of the ambient field for which the balancing field was originally set. In practice, the value of the resistor $R_4$ is so set that the reference level for the pointer is intermediate the width of the recording strip. With such an arrangement both positive and negative deviations are readily indicated within the limits $\pm 5000\ \gamma$.

When the system is first placed in operation, and also when the voltage of the current source 30 is changed to adjust the calibration, it is desirable to manually adjust the value of the D.C. compensating current flowing in the bridge circuit 20 to a value which, without the correcting effect of the feed-back circuits, will substantially compensate the magnetic field in which the element 24 exists. When such adjustment has been made, the instrument thereafter is capable of the maximum range of operation in both the positive and negative senses, i.e., increases or decreases in the magnetic field. To make this adjustment, the switch 94 is first depressed thereby shorting the output of the D.C. amplifier 90 and rendering the feed-back action ineffective. Then, while no feed-back action is occurring, the field balance resistor $R_1$ is adjusted until the balance indicating meter 85 reads substantially zero. The switch 94 is then opened, rendering the feed-back loop operative again. After this adjustment has been made, the feed-back action of the magnetometer feed-back loop will thereafter maintain the D.C. compensating field at the magnetometer bridge 20 at nearly exactly the value necessary to compensate the ambient magnetic field existing at the element 24 and the range of operation available will be a maximum in either the positive or negative direction about the value of magnetic field for which the adjustment was made.

It is to be noted that the operation of the feed-back loop $L_1$ to produce a single compensating current, offers advantages not available in other systems. One advantage of employing such a single current controlled entirely by a feed-back system for compensation, lies in the fact that variations in the values of various elements in the system have little or no effect on its value. As a result, the measurement of this current provides a reliable and accurate measurement of the strength of the ambient field. Variations in the values of field balance resistor $R_1$, in the characteristics of series tube $R_3$, in the gain characteristics of the D.C. amplifier 90, in the characteristics of filtering and amplifying circuits 70, or the phase detecting circuit 80, as well as changes in the D.C. resistance of any portion of the compensating current loop comprising the current source 30, magnetometer bridge 20, resistor $R_1$, and the resistor $R_2$ have substantially no effect upon the value of the compensating current. Because the feedback action operates substantially instantaneously when any such variations occur, it automatically becomes ineffective or unnoticeable almost immediately and the compensating current is reestablished quickly at substantially the same value it had prior to the occurrence of the variation.

The system of this invention possesses great advantages over one that employs more than one source of current to produce the compensating field, for example, one employing two sources, one of which compensates the major portion of the ambient field at the magnetometer element, while the other automatically provides additional compensation to reduce the residual magnetic field at the magnetometer element to substantially zero. In such a system, variations in the value of the current that compensates the major portion of the magnetic field, cause corresponding variations to occur in the other, automatically controlled, current. The latter variations are recorded as spurious changes in the ambient magnetic field being measured, even though no real change corresponding thereto has occurred. In contrast with such a two-source system, the present invention creates a single compensating field from a single compensating current which is maintained at substantially the exact value necessary to entirely balance out the magnetic field at the detector element 24.

The recording system employed in this invention permits full exploitation of the foregoing advantages of the single compensating current, especially where, as in geophysical prospecting, the variations of the magnetic field are only a small percentage of the total field being measured. In the present system high accuracy is obtained by balancing out nearly all of the potential across precision resistor $R_2$ by the stable batteries $B_1$ and $B_2$. By way of illustration, if the total magnetic field being measured is about 50,000 $\gamma$, and the corresponding voltage that appears across the precision resistor $R_2$ is 10 volts, the sum of the potentials produced by battery $B_1$ and the fraction of battery $B_2$ selected by the adjustment of the potentiometer $R_4$ may be set at about 9.5 volts. Thus the total potential appearing between terminal 114 and ground would be only 0.5 volt and variations in this potential might be expected to range from zero to 1 volt, thus requiring that the total voltage across potentiometer $R_5$ be 1 volt. In such a case, it is evident that the total range of operation of the recording potentiometer 100 is 1/10 of 50,000 $\gamma$, or 5000 $\gamma$.

It is important to note that the balancing motor 110 automatically moves the contact 105 of potentiometer $R_5$ to the position for which no difference in potential exists between the terminals 112 and 114 so that the sum total of the potentials of all of the sources in the potentiometer loop other than that across $R_2$ is exactly equal to the potential across resistor $R_2$. When this condition exists, no current flows in resistor $R_2$ other than that which is being measured; and all of this current flows through the bridge circuit 20. By employing a potentiometer 100 in which substantially no part of the compensating current is shunted thereto from the bridge circuit 20, accurate measurements may be made of the magnitude of the compensating current.

As explained hereinabove, the single compensating current is passed through a high precision resistor $R_2$ thereby producing a voltage thereacross which is always proportional to the value of that current to within a very high accuracy. The overall accuracy and stability of the potentiometer recording system 100 thus depends primarily upon the stability of the series batteries $B_1$ and $B_2$ and the value of the current flowing through potentiometer $R_5$. As previously mentioned, batteries $B_1$ and $B_2$ are of a type providing stable output potentials under conditions under which small currents pass therethrough and thus the position of the pointer 102 on the recording paper 105 provides a direct and highly accurate indication of any changes in the magnitude of the current flowing in resistor $R_2$. In practice, the potentials produced by batteries $B_1$ and $B_2$ are stable to within about 1 part in 50,000 parts during substantial periods of operation of the order of hours so that errors from this source are less than 1 $\gamma$ over such periods.

As previously explained, variations in the output voltage of the current source 30 are of little or no consequence in the operation of the feed-back loop $L_1$, since any variation in the compensating current are almost instantaneously compensated for by the feed-back action of this loop. However, variations in the source of potential 30 cause some variation in the indications of the recording system as evidenced by the movement of the pointer 102 because of the effect that these variations have on the current flowing through resistor $R_5$. However, since the total voltage across resistor $R_5$ is only a small fraction, such as about 1/10, of the total potential existing across precision resistor $R_2$, it is apparent that, for a given accuracy, the variations in the voltage of the source 30 which may be tolerated are increased by a factor of 10 over what they would be if the stable batteries $B_1$ and $B_2$ did not buck-out a large fraction, in this case about 9/10, of the voltage appearing across resistor $R_2$. For example, in order to maintain a recording accuracy of ±5 γ out of a total of 50,000 γ, variations in the output voltage of the source 30 may be as great at .01%. But if the stable batteries $B_1$ and $B_2$ were not employed, variations exceeding .001% could not be tolerated in the output voltage of source 30. Thus the bucking-out or balancing of substantially all of the voltage to be measured by means of a highly stable set of batteries, and the balancing of the remaining fraction of the total voltage to be measured against that produced by a current source, permits the use of a relatively unstable regulated current source to obtain a relatively high degree of accuracy.

Another feature of the recording loop which provides for convenient operation thereof is the zero shift adjustment provided by the combination of the battery $B_2$ and potentiometer $R_4$. It will be seen that when the potentiometer recording loop is in a balanced condition and the balancing motor 110 has ceased to operate, thereafter an adjustment of the arm of potentiometer $R_4$ causes an unbalance in the potentials in this loop and hence causes the A.C. amplifier 103 to operate the balancing motor 110 in such a direction that the contact 105 of the potentiometer $R_5$ will be moved to a new position in which the total voltage in the potentiometer loop is zero again. Thus the potentiometer $R_4$ may be adjusted to set the recording element 102 at any desired position on the scale that may be required for convenient operation thereof.

It will be apparent, of course, that in order to partake of the advantages of a primary object of the present invention, which is the creation of a single D.C. current, the magnitude of which is always proportional to the magnitude of the magnetic field being measured and the measurement and recording of the value of said current by means of a self-balancing recording potentiometer, it is not necessary to provide a single source of power to act in the dual role of supplying both a portion of the reference voltage for the recording potentiometer and supplying current to create the compensating magnetic field at the magnetometer element. For example, one current source, such as any battery could be employed to supply the compensating current and an additional set of mercury cells, for example, could supply the current passing through potentiometer $R_5$. In such a case, the two loops, i.e., the magnetometer feed-back loop, and the potentiometer recording loop would be completely separate from one another except for the connection therebetween provided by the resistor $R_2$. In practice, however, for the type of geophysical exploration for which the present invention is admirably suited, the combination source 30 serves both purposes efficiently. It will be understood of course, that the triode $R_3$ may be replaced by a variable resistor of a type having a sliding contact and that the value of this resistor may be controlled by the employement of a servo-motor operated by the output of the amplifier-filter 70 to adjust the position of the sliding contact automatically to produce a compensating current of the correct value.

It will also be apparent that the current may be controlled in other ways than by varying the resistance of a triode $R_3$ in the current loop $L_2$. For example, the current might be controlled by applying a voltage from the output of the D.C. amplifier 90 in series in this loop at the point where the triode $R_3$ is connected.

Though only one main embodiment and only a few variations of the invention have been described in which the various objects are attained, it will be obvious that the invention is not limited to those particular embodiments and variations but is capable of being embodied in many other forms. Various changes which will now suggest themselves to those skilled in the art may be made in the form and details of construction, and arrangement of elements without departing from the principles of the invention. It is therefore to be understood that the invention includes all embodiments thereof that come within the scope of the appended claims.

The invention claimed is:

1. In a magnetometer:

A magnetic field detector including a sensitive element responsive to a component of the net magnetic field to which it is exposed in accordance with the strength of said component;

Winding means continuously controlled by a current passing therethrough for producing a single variable neutralizing magnetic field in opposition to an ambient magnetic field to reduce the strength of the component to which said sensitive element is exposed;

A precision resistor;

A single current source connected in series with said precision resistor, two electron discharge devices connected in series with said source, said source continuously supplying a single direct current through said precision resistor and through said winding means, the strength of said neutralizing field being unidirectional and proportional to the amplitude of said single direct current;

Means including a feed-back loop connected to said winding means and one of said electron discharge devices for varying the magnitude of said single direct current in accordance with the magnitude of said component;

And means for measuring the voltage produced across said precision resistor to indicate the strength of the ambient magnetic field.

2. In a magnetometer:

A magnetic field detector including a sensitive element responsive to a component of the net magnetic field to which it is exposed in accordance with the strength of said component;

Winding means continuously controlled by a current passing therethrough for producing a single variable neutralizing magnetic field in opposition to an ambient magnetic field to reduce the strength of the component to which said sensitive element is exposed;

A precision resistor;

A variable resistance means;

An adjustable field balance resistor;

A current source connected to supply a single direct current through said precision resistor, said variable resistance means, said field balance resistor, and said winding means, the strength of said neutralizing field being unidirectional and proportional to the strength of said single direct current;

Means for varying the magnitude of said variable resistance means as an inverse function of the magnitude of said component, whereby said single direct current varies in accordance with said component;

And means for measuring the voltage produced across said precision resistor to indicate the strength of the ambient magnetic field.

3. In a magnetometer:

A magnetic field detector including a sensitive element responsive to a component of the net magnetic field to which it is exposed in accordance with the strength of said component;

Winding means controlled by a current passing therethrough for producing a single variable neutralizing magnetic field in opposition to an ambient magnetic field to reduce the strength of the component to which said sensitive element is exposed;

A precision resistor;

A variable resistance means;

A current source connected to supply a single current through said precision resistor, said variable resistor, and said winding means, the strength of said neutralizing field being proportional to the strength of said single current, Means for varying the magnitude of said variable resistance means as an inverse function of the magnitude of said component, whereby said single current varies in accordance with said component, A self-balancing potentiometer including a contact adjustably engaging a potentiometer resistance element and including an indicating pointer movable with said contact to a point indicative of a voltage across an input circuit;

A voltage source;

Means for connecting said precision resistor and said voltage source across the input circuit of said potentiometer;

And means for connecting said potentiometer resistance element across the output of said current source.

4. In a magnetometer:

A magnetic field detector including a sensitive element responsive to a component of the net magnetic field to which it is exposed in accordance with the strength of said component;

Winding means controlled by a current passing therethrough for producing a single variable neutralizing magnetic field in opposition to an ambient magnetic field to reduce the strength of the component to which said sensitive element is exposed;

A precision resistor;

A variable resistance means;

An adjustable field balance resistor;

A current source connected to supply a single current through said precision resistor, said variable resistance means, said field balance resistor, and said winding means, the strength of said neutralizing field being proportional to the strength of said single current;

Means for varying the magnitude of said variable resistance means as an inverse function of the magnitude of said component, whereby said single current varies in accordance with said component;

A self-balancing potentiometer including a contact adjustably engaging a potentiometer resistance element and including an indicating pointer movable with said contact to a point indicative of a voltage across an input circuit;

A voltage source;

Means for connecting said precision resistor and said voltage source across the input circuit of said potentiometer;

And means for connecting said potentiometer resistance element across the output of said current source.

5. In a magnetometer:

A magnetic field detector including a sensitive element responsive to a component of the net magnetic field to which it is exposed in accordance with the strength of said component;

Winding means controlled by a current passing therethrough for producing a single variable neutralizing magnetic field in opposition to an ambient magnetic field to reduce the strength of the component to which said sensitive element is exposed;

A precision resistor;

A variable resistance means;

An adjustable field balance resistor;

A current source connected to supply a single current through said precision resistor, said variable resistance means, said field balance resistor, and said winding means, the strength of said neutralizing field being proportional to the strength of said single current;

Means for varying the magnitude of said variable resistance means as an inverse function of the magnitude of said component, whereby said single current varies in accordance with said component;

A self-balancing potentiometer including a contact adjustably engaging a potentiometer resistance element and including an indicating pointer movable with said contact to a point indicative of a voltage across an input circuit;

A voltage source;

Means for connecting said precision resistor and said voltage source across the input circuit of said potentiometer;

Sensitivity control resistance means;

And means for connecting said potentiometer resistance element and said sensitivity control resistance means across the output of said current source.

6. In a magnetometer:

A magnetic field detector including a sensitive element responsive to a component of the net magnetic field to which it is exposed in accordance with the strength of said component;

Winding means controlled by a current passing therethrough for producing a single variable neutralizing magnetic field in opposition to an ambient magnetic field to reduce the strength of the component to which said sensitive element is exposed;

A precision resistor;

A variable resistance means;

An adjustable field balance resistor;

A current source connected to supply a single current through said precision resistor, said variable resistance means, said field balance resistor, and said winding means, the strength of said neutralizing field being proportional to the strength of said single current;

Means for varying the magnitude of said variable resistance means as an inverse function of the magnitude of said component, whereby said single current varies in accordance with said component;

A self-balancing potentiometer including a contact adjustably engaging a potentiometer resistance element and including an indicating pointer movable with said contact to a point indicative of a voltage across an input circuit;

A voltage source;

Means for connecting said precision resistor and said voltage source across the input circuit of said potentiometer;

Means for connecting said potentiometer resistance element across the output of said current source;

And means for adjusting the voltage available at the output of said current source.

7. In a magnetometer:

A magnetic field detector including a sensitive element responsive to a component of the net magnetic field to which it is exposed in accordance with the strength of said component;

Winding means controlled by a current passing therethrough for producing a single variable neutralizing magnetic field in opposition to an ambient magnetic field to reduce the strength of the component to which said sensitive element is exposed;

A precision resistor;

A variable resistance means;

An adjustable field balance resistor;

A current source connected to supply a single current through said precision resistor, said variable resistance means, said field balance resistor, and said winding means, the strength of said neutralizing field being proportional to the strength of said single current;

Means for varying the magnitude of said variable resistance means as an inverse function of the magnitude of said component, whereby said single current varies in accordance with said component;

A self-balancing potentiometer including a contact adjustably engaging a potentiometer resistance element and including an indicating pointer movable with said contact to a point indicative of a voltage across an input circuit;

A voltage source;

Means for connecting said precision resistor and said voltage source across said input circuit of said potentiometer;

Sensitivity control resistance means;

Means for connecting said potentiometer resistance element and said sensitivity control resistance means across the output of said current source;

And means for adjusting the voltage available at the output of said current source.

8. In a magnetometer:

A magnetic field detector including a sensitive element responsive to a component of the net magnetic field to which it is exposed in accordance with the strength of said component;

Winding means controlled by a current passing therethrough for producing a single variable neutralizing magnetic field in opposition to an ambient magnetic field to reduce the strength of the component to which said sensitive element is exposed;

A precision resistor;

A variable resistance means;

An adjustable field balance resistor;

A current source connected to supply a single current through said precision resistor, said variable resistance means, said field balance resistor, and said winding means, the strength of said neutralizing field being proportional to the strength of said single current;

Means for varying the magnitude of said variable resistance means as an inverse function of the magnitude of said component, whereby said single current varies in accordance with said component;

A self-balancing potentiometer including a contact adjustably engaging a potentiometer resistance element and including an indicating pointer movable with said contact to a point indicative of a voltage across an input circuit;

A voltage source;

Means for connecting said precision resistor and said voltage source across the input circuit of said potentiometer;

Sensitivity control resistance means;

Means for connecting said potentiometer resistance element and said sensitivity control resistance means across the output of said current source;

Means for adjusting the voltage available at the output of said current source; a reference voltage source;

And means for injecting a calibrating voltage in series with said reference voltage source and said precision resistor.

9. In a magnetometer:

A magnetic field detector including a sensitive element responsive to a component of the net magnetic field to which it is exposed in accordance with the strength of said component;

Winding means controlled by a current passing therethrough for producing a single variable neutralizing magnetic field in opposition to an ambient magnetic field to reduce the strength of the component to which said sensitive element is exposed; a series circuit including A precision resistor, A variable resistance means, An adjustable field balance resistor, said winding means, and A current source connected to supply a single current through said precision resistor, said variable resistance means, said field balance resistor, and said winding means, the strength of said neutralizing field being proportional to the strength of said single current;

Electronic means for varying the magnitude of said variable resistance means as an inverse function of the magnitude of said component, whereby said single current varies in accordance with said said component;

A self-balancing recording potentiometer including a potentiometer resistance element having a movable contact and including a recording element movable with said contact to a point indicative of a voltage across an input circuit and also including means for driving a strip of recording medium past said recording element to record changes in said voltage;

A voltage source;

Means for connecting said precision resistor and said voltage source across the input circuit of said potentiometer;

And a source of reference voltage connected across said potentiometer resistance element.

10. In a magnetometer:

A magnetic field detector including a sensitive element responsive to a component of the net magnetic field to which it is exposed in accordance with the strength of said component;

Winding means controlled by a current passing therethrough for producing a single variable neutralizing magnetic field in opposition to an ambient magnetic field to reduce the strength of the component to which said sensitive element is exposed;

A precision resistor;

A variable resistance means;

An adjustable field balance resistor;

A current source connected to supply a single current through said precision resistor, said variable resistance means, said field balance resistor, and said winding means, the strength of said neutralizing field being proportional to the strength of said single current;

Means for varying the magnitude of said variable resistance means as an inverse function of the magnitude of said component, whereby said single current varies in accordance with said component;

A self-balancing recording potentiometer including a potentiometer resistance element having a movable contact and including a recording element movable with said contact to a point indicative of a voltage across an input circuit and also including means for driving a strip of recording medium past said recording element to record changes in said voltage;

A voltage source;

Means for connecting said precision resistor and said voltage source across the input circuit of said potentiometer;

Sensitivity control resistance means;

Means for connecting said potentiometer resistance element and said sensitivity control resistance means across the output of said current source; a reference voltage source;

Means for injecting a calibrating voltage in series with said reference voltage source and said precision resistor;

And means for adjusting the voltage available at the output of said clurrent source whereby the sensitivity of said potentiometer may be varied independently of the current flowing through said precision resistor.

11. In a magnetometer:

A magnetic field detector including a sensitive element responsive to a component of the net magnetic field to which it is exposed in accordance with the strength of said component;

Winding means controlled by a current passing therethrough for producing a single variable neutralizing magnetic field in opposition to an ambient magnetic field to reduce the strength of the component to which said sensitive element is exposed;

A single current source, two electron discharge devices connected in series with said source, said source continuously supplying a single direct current through said winding means, the strength of said neutralizing field being unidirectional and proportional to the amplitude of said single direct current;

Means including a feed-back loop connected to said winding means and one of said electron discharge devices for varying the magnitude of said single direct current in accordance with the magnitude of said component;

And means for measuring said direct current to indicate the strength of the ambient magnetic field.

12. In a magnetometer:

A magnetic field detector including a sensitive element responsive to a component of the net magnetic field to which it is exposed in accordance with the strength of said component;

Winding means controlled by a current passing therethrough for producing a single variable neutralizing magnetic field in opposition to an ambient magnetic field to reduce the strength of the component to which said sensitive element is exposed;

A variable resistance means,

A current source, two electron discharge devices connected in series with said source, said source continuously supplying a single direct current through said variable resistance means, and said winding means, the strength of said neutralizing field being unidirectional and proportional to the strength of said single direct current;

Means including a feed-back loop connected to said winding means and one of said electron discharge devices for varying the magnitude of said variable resistance means as an inverse function of the magnitude of said component, whereby said single direct current varies in accordance with said component;

And means for measuring said direct current to indicate the strength of the ambient magnetic field.

13. In a magnetometer:

A magnetic field detector including a sensitive element responsive to a component of the net magnetic field to which it is exposed in accordance with the strength of said component;

Winding means controlled by a current passing therethrough for producing a single variable neutralizing magnetic field in opposition to an ambient magnetic field to reduce the strength of the component to which said sensitive element is exposed;

A variable resistance means;

An adjustable field balance resistor;

A current source, two electron discharge devices connected in series with said source, said source continuously supplying a single direct current through said variable resistor, said field balance resistor, and said winding means, the strength of said neutralizing field being unidirectional and proportional to the strength of said single direct current;

Means including a feed-back loop connected to said winding means and one of said electron discharge devices for varying the magnitude of said variable resistance means as an inverse function of the magnitude of said component, whereby said single direct current varies in accordance with said component;

And means for measuring said direct current to indicate the strength of the ambient magnetic field.

14. In a magnetometer,

A magnetic field detecting means having an input and an output, said detecting means including an unbalanced pair of circuits linked to magnetic field sensitive means responsive to a component of the net magnetic field to which the sensitive means is exposed;

An oscillator for applying an alternating electrical voltage to said input for saturating said magnetic field sensitive means during alternate half-cycles of said alternating current voltage whereby alternate positive and negative pulses appear in said output, the magnitude of the positive pulses increasing and the magnitude of the negative pulses decreasing in accordance with the magnitude of said component of net magnetic field, the frequency of occurrence of said positive and negative pulses being the same as the frequency of said alternating current voltage;

A circuit including a precision resistor, a variable resistance means, and a direct current source, said circuit producing a unidirectional neutralizing magnetic field having a strength proportional to the strength of the single direct current flowing through said resistor, said neutralizing magnetic field being the only neutralizing field and opposing the ambient magnetic field in the region of said magnetic field sensitive means to reduce the net magnetic field to which said sensitive means is exposed;

Instantaneously acting, solely electronic feedback means controlled by the output of said magnetic field detecting means and being instantaneously responsive to the difference in magnitude of said alternate positive and negative pulses for varying the magnitude of said variable resistance means as an inverse function of the magnitude of said component whereby said single direct current varies in accordance with the strength of said net magnetic field; and Means for measuring the voltage produced across said precision resistor to indicate the strength of said ambient magnetic field.

15. A magnetometer as defined in claim 14 including an adjustable field balance resistor for adjusting the current flowing through said precision resistor.

16. A magnetometer as defined in claim 15 in which said precision resistor, variable resistance means, and direct current source are connected in series.

References Cited in the file of this patent

UNITED STATES PATENTS

| | | |
|---|---|---|
| 2,245,124 | Bonn | June 10, 1941 |
| 2,406,870 | Vacquier | Sept. 3, 1946 |
| 2,564,854 | Muffly | Aug. 21, 1951 |
| 2,570,870 | Schmitt et al. | Oct. 9, 1951 |
| 2,663,843 | Wickerhan et al. | Dec. 22, 1953 |
| 2,727,206 | Ryerson | Dec. 13, 1955 |
| 2,755,434 | Yetter | July 17, 1956 |
| 2,757,539 | Broomell | Aug. 7, 1956 |